US006999751B2

(12) United States Patent
Thorson et al.

(10) Patent No.: US 6,999,751 B2
(45) Date of Patent: Feb. 14, 2006

(54) DETECTION OF CLONED COMMUNICATION UNITS BASED ON MESSAGE CONTENTS

(75) Inventors: Dean E. Thorson, Grayslake, IL (US); Wayne A. Keels, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/820,655

(22) Filed: Apr. 8, 2004

(65) Prior Publication Data

US 2005/0227668 A1 Oct. 13, 2005

(51) Int. Cl.
*H04M 1/66* (2006.01)

(52) U.S. Cl. ......................... 455/411; 380/247; 340/5.8

(58) Field of Classification Search ................ 455/411, 455/435.1, 410, 40; 340/5.8; 380/247, 250
See application file for complete search history.

(56) References Cited

U.S. PATENT DOCUMENTS 5,467,382 A * 11/1995 Schorman ................... 455/410
5,765,107 A * 6/1998 Korowajczuk .............. 455/410
5,953,652 A * 9/1999 Amin et al. ................ 455/410
6,295,446 B1 * 9/2001 Rocha ........................ 455/410
6,370,373 B1 * 4/2002 Gerth et al. ................ 455/410
6,377,791 B1 * 4/2002 Pirila ........................ 455/410
6,466,777 B1 * 10/2002 Urita .......................... 455/410
6,594,498 B1 * 7/2003 McKenna et al. .......... 455/517
6,718,178 B1 * 4/2004 Sladek et al. ............... 455/466

OTHER PUBLICATIONS

"Upper Layer (Layer 3) Signaling Standard for CDMA2000 Spread Spectrum Systems Release 0"; 3rd G Partnership Project 2; 3GPP2.S0005-0; Ver.3.0; Jun. 15, 2000; pp. 3-123-3-132.
"Medium Access Control (MAC) Standard for CDMA2000 Spread Spectrum Systems Release 0-Addendum 2"; 3rd G Partnership Project 2; 3GPP2.S0003-0; Ver.3.0; Jun. 15, 2001; pp. 2-25-2-30.
"Signaling Link Access Control (LAC) Specification for CDMA2000 Spread Spectrum Systems Release 0"; 3rdG Partnership Project 2; 3GPP2.S0004-0; Ver.3.0;Jun. 15, 2000; pp. 2-27-2-30.

* cited by examiner

*Primary Examiner*—Marsha D. Banks-Harold
*Assistant Examiner*—Nghi H. Ly

(57) ABSTRACT

A method (FIG. 3), corresponding call screening unit, and base station (FIG. 2), suitable for detecting cloned communication units (111 or 113), are operable to receive a first response message and a second response message (305); determine whether identification fields (ESNs, MINs) corresponding to the response messages are equivalent (307); and if so, assess whether message contents or message properties corresponding to the response messages are not correlated (311) thus indicating the response messages are from different communication units; and when not correlated, decide that one of the response messages corresponds to a cloned communication unit (313).

3 Claims, 3 Drawing Sheets

DETECTION OF CLONED COMMUNICATION UNITS BASED ON MESSAGE CONTENTS

FIELD OF THE INVENTION

This invention relates in general to communication systems, and more specifically to a method and apparatus for detecting cloned communication units based on message contents.

BACKGROUND OF THE INVENTION

One problem that operators and users of communications systems and particularly wireless communication systems often need to address is that of security or privacy for communications on these systems. This problem may be particularly pronounced is systems that provide service to a multitude of users via communications units, such as cellular phones. One technique used by ne'er-do-wells to monitor another's communication is using a cloned communication unit or phone, where a cloned unit is configured to duplicate all identification characteristics, such as identification/serial numbers of a legitimate/authorized phone.

Many such systems and standards that define such systems include provisions for authorizing and authenticating communication units that utilize the services. For example the cellular system defined by the well known IS-2000 standards specifies procedures for authentication, however these procedures and the requisite equipment can be a financial burden for a system operator and typically add latency to obtaining or acquiring services, e.g. while the phone is being authenticated, etc.

Clearly a need exists for cost effective approaches for detecting cloned communication units.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
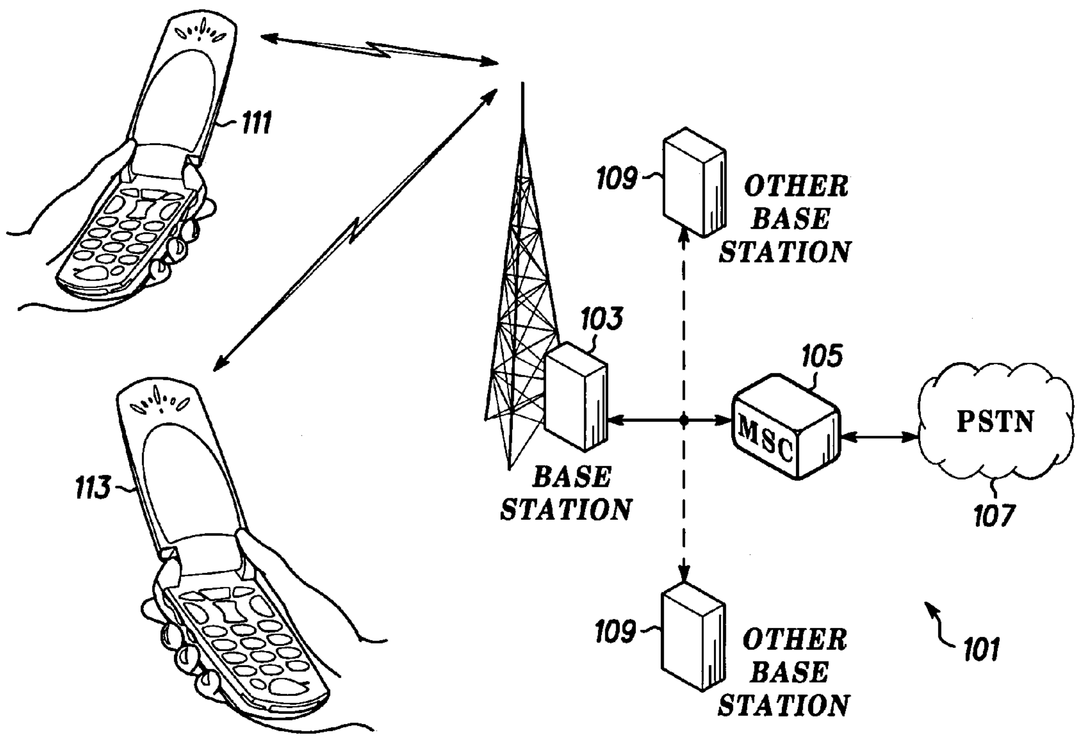
FIG. 1 depicts, in a simplified and representative form, a block diagram of a communications system suitable for employing duplicate communication unit detection.

In overview, the present disclosure concerns communications systems that provide service to communications units or more specifically users thereof operating therein. More particularly various inventive concepts and principles embodied in methods and apparatus for the detection or discovery of cloned or duplicated communication units are discussed. The communications systems of particular interest are those being deployed such as CDMA2000 spread spectrum systems although the principles and concepts can have application in many other wide area or local area systems where differences between a cloned and unauthorized versus authorized communication unit can be detected or discovered based on differences between signals that are provided by such units.

As further discussed below various inventive principles and combinations thereof are advantageously employed to detect or discover a cloned or duplicated communication unit based on expected or resultant impacts on inbound signals that can result from such units, thus alleviating various problems associated with cloned communication units, such as the monitoring of legitimate communications with authorized communication units. This is accomplished in a cost effective low latency manner provided these principles or equivalents thereof are utilized. The disclosed approaches can be used in conjunction with other authentication or authorization techniques and equipment and still yield a low latency approach, at least until a possible cloned unit is detected thereby causing a more thorough authentication process, etc. to be utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as general purpose processors or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the preferred embodiments.

Referring to FIG. 1, a simplified and representative block diagram of a communications system 101 suitable for using various embodiments of a cloned communication unit detection method and apparatus will be described and discussed. The FIG. 1 exemplary communication system 101 is generally known and depicts a base station 103 that is intercoupled to a mobile switching center 105 along with other base stations 109. The mobile switching center 105 is arranged to inter couple communications from or to the appropriate base stations and a public switched network, such as a public switched telephone network. The base stations operate to support an air interface with a multitude of communication units, where base station 103 is shown with a radio link or air interface to two communication units 111, 113. Note that actual communication systems may be significantly more complex and include various additional known entities, such as base site controllers, billing, authorization, authentication, and voice mail servers that are not germane to the present discussions and thus for the sake of simplicity have not been depicted.

Unfortunately, one of these communication units, such as unit 111 can be an unauthorized communication unit, such as a cloned version of communication unit 113. Cloned or duplicated communication units are one means or approach that may be used for unauthorized monitoring of another communication or other mischief. Normally this is illegal, however it may be necessary to take additional measures to preclude such activities. A cloned communication unit normally refers to a unit that assumes the identity of another and authorized communication unit. Thus the cloned communication unit, for example will have the same ESN (electronic serial number) or MIN (mobile ID number or mobile phone number). Therefore, whenever one or both of these numbers are used directly or in a derivative form to convey identity between the communication system or portion thereof and the communication unit, both units are likely to send or receive the same information.

For example for CDMA communication units the cloned information can comprises the Electronic Serial Number (ESN)—a 32-bit number used by manufacturers to uniquely identify the communication hardware or device and a Mobile Identification Number (MIN)—a 34-bit number that is a digital representation of the 10-digit number assigned to a communication unit. The 10-digit number referred to here is usually the mobile station's phone number. Many CDMA standards use these two pieces of information extensively, for many different purposes. If two phones or communication units are programmed with identical values for these two parameters, the network will have a very difficult time distinguishing the real phone from the clone because, for example, these devices or units will transmit and receive using the same physical layer scrambling or spreading sequences, use the same information when telling the network their identities, choose the same Paging Channel Slots and choose the same Access Channel Slots.

Continuing our example a cloned phone can be used to monitor the conversation of a network-initiated call to a legitimate communication unit, at least when the illegal or cloned device is reasonably physically proximity to the authorized communication unit as follows. The Network, e.g. base station will transmit a Page Message or General Page Message on the Paging Channel in the last-known area where the communication unit or mobile station registered. Both the real or authorized communication unit and cloned communication unit or phones are monitoring the correct Paging Channel Slot, so both receive this message. Both the real and clone phones attempt to transmit a Page Response Message on the Access Channel. Both phones will place the same identity information in the Page Response Message. Both phones will normally place identical other information in the Page Response Message. The other or remaining information (besides identity information) is determined by system information and the contents of the received Page Message or General Page Message. Both phones will attempt to use the same Access Channel to transmit the Page Response Message; e.g. on of up to 32 Access Channels per paging channel.

If the network receives Page Response Messages from both phones and the Layer 2 sequence information (ESN, MIN, etc.) in those messages are identical, the network (by specification) considers the second received message to be a re-transmission, declares the second one a duplicate and ignores it. The Network will receive one of the identical transmissions and will acknowledge reception by sending a Base Station Acknowledgement Order on the Paging Channel. Both phones will receive this message and will stop attempting to transmit the Page Response Message on the Access Channel. The remaining signaling is identical and will be processed by the Network and both phones similarly. Once the "call" is connected to the Traffic Channel, the clone can demodulate the forward link intended for the real phone because it uses the same forward link scrambling code.

In order to detect such cloned communication units and overcome the resultant problems, the communication system is advantageously modified in accordance with the inventive principles and concepts discussed below.

Figure 2:
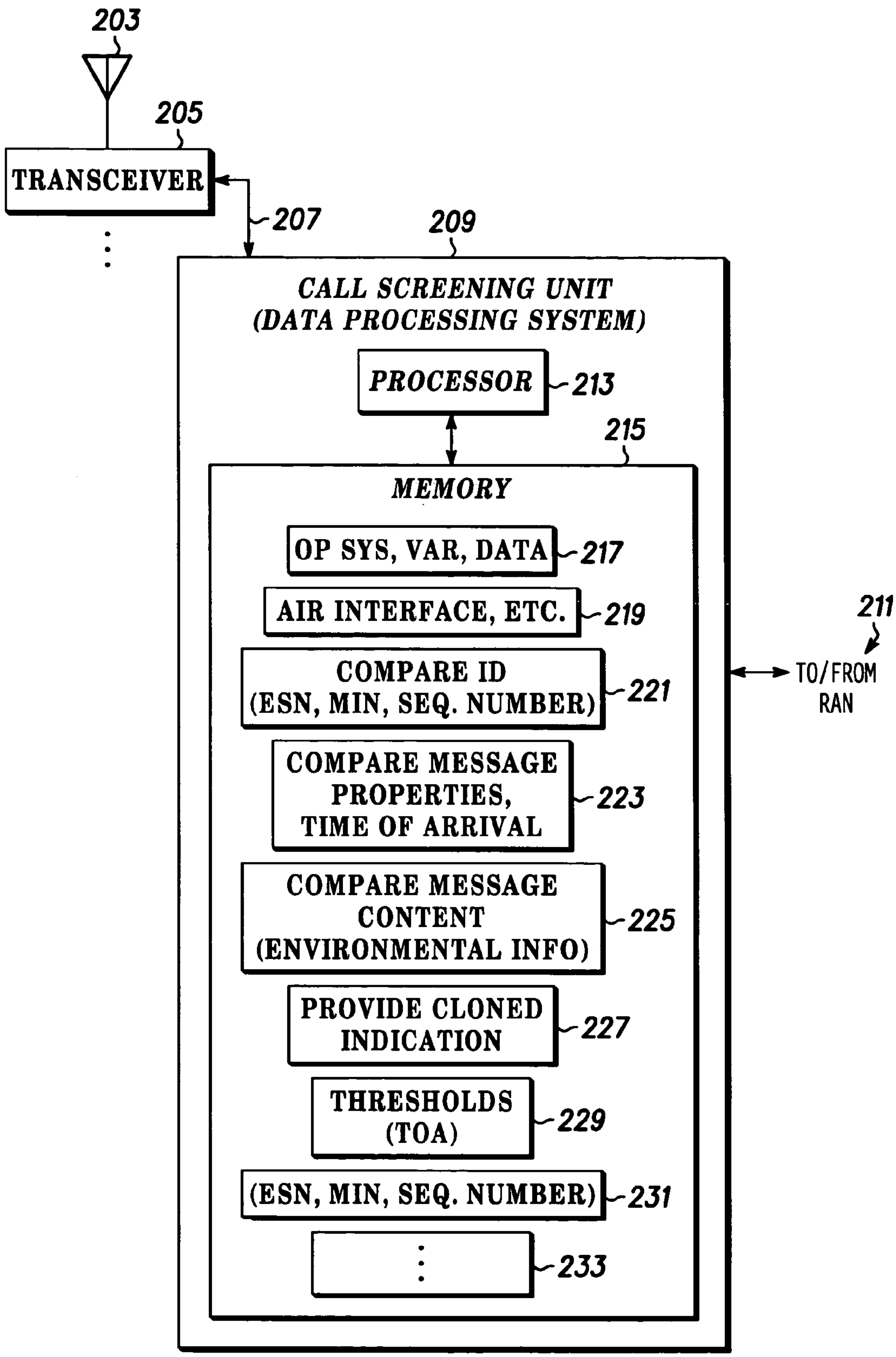
FIG. 2 depicts, in a simplified and representative form, a base station suitable for use in the communications system of FIG. 1, the base station implementing a call screening unit for detecting cloned communication units.

Referring to FIG. 2, a simplified and representative block diagram of a base station suitable for use in the communications system of FIG. 1 will be described and discussed. The base station implements and utilizes a call screening unit for detecting cloned communication units. The base station is coupled to an antenna 203 via a transceiver 205. Typically a base station will have a plurality of such transceivers however the relevant operation of one is sufficient to explain the principles and concepts according to the present invention. The transceiver is known and can vary with the access technology but operates as a receiver and transmitter for receiving and transmitting radio signals via the antenna 203 to communications units, such as units 111, 113, within a respective coverage area.

The transceiver is coupled to an input/output 207 of the call screening unit 209 and the system is further coupled to the balance of a radio access network at 211, such as base station controllers, mobile switching centers and the like. The call screening unit 209 includes a processor 213 coupled to a memory 215. The call screening unit can include for example a data processing system that can comprise various functionality suitable for handling other signal processing duties, such as supporting an air interface with communication units or base station controlling duties as will be appreciated in the field. The processor 213 can be comprised of one or more general purpose processors or digital signal processors and application specific integrated circuits with a processing core, etc all of which are generally available and will be known to one of ordinary skill. The memory is also known and can be comprised of various combination of random access memory, read only memory, magnetic memory and so forth.

The memory is used to store various operating subroutines or software instructions, variables, and data. When the processor executes the appropriate routines the data processing system will operate to control and support the base station and the call screening unit will operate to detect or discover cloned or duplicated communication units as further described below. The various routines include, as generally depicted, an operating system, variables, and data routine 217 that provides the overall operational structure and functionality. Further included are various air interface routines 219 that can vary with the access technology and specific architecture of the base station and communication system but that generally support functions for an air interface, such as channel coding, modulation, transmitter control, receiver control, demodulation, call processing and the like as will be appreciated by one of ordinary skill.

Other routines, specifically depicted and largely devoted to the call screening unit functionality include an identification field comparison routine 221, a routine 223 for comparing message properties, such as time of arrival, and a routine 225 for comparing message content, such as environmental information (radio environment report) are shown. These comparison routines are used to determine whether various information associated with or corresponding to different response messages indicate whether the respective response messages originated with a cloned unit, e.g. detect a cloned unit as will be further discussed below. Then a routine 227 provides an indication of a cloned communication unit under appropriate circumstances, where the indication may be used to deny or discontinue service, send appropriate service messages to the unit(s) or other communication system entities in a system management role or other wise initiate appropriate action.

Further depicted is a portion of memory 229 for storing thresholds for various of the comparison routines, such as the content and properties comparison routines 221, 223 and these thresholds may depend on various circumstances, such as the particular parameter that is being compared, system preferences, and so forth. An additional data base 231 comprises mobile station or communication unit identifying information, such as ESNs, MINs, message sequence numbers, etc. that are used to coordinate communications with particular communication units. Various other routines 233, such as user and service interface, alarms and the like routines, possibly other applications that will be appreciated by one of ordinary skill but not here relevant are normally also included.

In this embodiment the call screening unit 209 is depicted as a portion of a controller and data processing system and co-located with the base station 103 and represents incremental processing duties for the processing and control functions of the base station. Note that it may be appropriate to locate this data processing function at other locations or points within the communication system. Other locations, such as a base site controller or the MSC 105 could offer an advantage of a centralized point for this processing for several or all of the base stations, however there could be a tradeoff with the added resource costs of transporting the underlying information and any incremental latency resulting from such transport.

In operation the call screening unit 209 is operable to detect or for detecting cloned (duplicated, unauthorized) communication units operating in a communication system, such as a cdma2000 system. The call screening unit 209 comprises an input, such as input 207 that is coupled to a signal further comprising a first response message and a second response message, that was received, for example by the transceiver 205, and a processor 213 that is coupled to the input and operable to determine whether the first response message and the second response message originated from a cloned communication unit, such as one of communication units 111, 113. Note that the response messages are messages that are received, for example, on an access channel in a cdma2000 system.

More specifically the processor is operable using the routines 221: to determine whether a first identification field corresponding to the first response message is equivalent to a second identification field corresponding to the second response message. In one embodiment the processor determines whether the Mobile ID numbers (MINs—mobile phone numbers) and Electronic Serial Numbers (ESNs) for the corresponding messages are the same and if so whether the message sequence numbers are the same. When the first identification field is equivalent to the second identification field, the processor using the routines 225, 223 is further operable to assess whether a first message content or a first message property corresponding to the first response message is not correlated, respectively, with a second message content or a second message property corresponding to the second response message. If the respective content and properties are not correlated, e.g. deviate from expected such content and properties, this indicates that the response messages are not duplicate response messages, e.g. did not originate from the same communication unit. Thus when the respective content and properties are not correlated, the processor, using the routine 227, operates to determine, to declare, or to decide that one of the first response message and the second response message corresponds to a cloned communication unit.

In one embodiment, the call screening unit specifically the processor in determining whether the respective contents are not correlated is operable, using the routine 225 to assess whether first environmental information is not correlated with second environmental information, where the first and second environmental information correspond respectively to an environment of a first and second communication unit that is, respectively the source of the first and the second response message. This environmental information may take various forms including information corresponding to a radio environment or a geographic location, respectively, the first and the second communication unit. The radio environment can correspond to signals available or strength of available signals for, respectively, the first and the second communication unit and the location information can be GPS (global positioning system) coordinates or other latitude-longitude coordinates derived in one of various known manners and according to what means may be available to the communication units.

More specifically the radio environment can comprises a radio environment report (RER) according to a code division multiple access (CDMA) system, such as the RER that can be provided with the response message in a cdma2000 system as will be further discussed below. The basic concept is that the authorized communication unit and the cloned communication unit are unlikely to be in the same exact location and thus unlikely to be able to detect or receive exactly the same signals at the same power levels. Thus if the radio environments corresponding to the respective response messages are not correlated or sufficiently uncorrelated, e.g. different, it is likely that a cloned communication unit is the originator of one of the response messages. Of course the RERs may be somewhat different, (the response messages will not have been sent at the same time especially if one is a repeat response message from the same unit.) and still be correlated, for example small differences is power levels. It is expected that one of ordinary skill given the present disclosure can experimentally determine an allowable difference between RERs taking into consideration the difference in origination times, thus radio environment, for a repeat message and the costs of making an erroneous decision that a cloned unit has been detected.

In a further embodiment the processor in determining whether the message properties are not correlated is further operable, using the routine 223, to assess whether a first arrival time of the first response message is not correlated with a second arrival time of the second response message. Note that in many communication systems a communication unit will repeat messages a number of times if an acknowledgment of the message is not received. Thus some attempt to distinguish ordinary repeated response messages originated by an authorized communication unit from duplicated response messages sent by a cloned communication unit may be required Typically these repeated messages are transmitted from the mobile with certain scheduling limitations, e.g. a minimum time lapse before a message is repeated as will be discussed further below. Thus if a time of arrival for each response message is recorded, the processor can further compare the first and the second arrival time to provide a relative arrival time and when the relative arrival time satisfies a threshold from location 229 determine that the first message property is not correlated with the second message property.

Once it is decided that one of the first response message and the second response message corresponds to the cloned communication unit, the processor can operate to initiate a denial of service to any communication unit corresponding to the first identification field (note the second identification field has been found to be equivalent). This can take the form of a release message being initiated by the processor and sent via the transceiver 205 to the communication unit(s) in a cdma2000 communication system where this message need not specify any reasons. Alternatively or additionally the denial of service can further include the processor operating to initiate sending a text message to the communication unit(s) corresponding to the first identification field, where this message may direct the operator or user to call a number, have the unit serviced, or the like.

In one example system, namely a cdma2000 system, where the information in the Page Response Message transmitted from both phones, e.g. authorized communication unit and cloned communication unit, are identical under normal conditions, the network can use optional information known as the Radio Environment Report to find a difference. Note that the RER is included in the Page Response Message as a mandatory element in cdma2000 systems that operate at a protocol revision of 6 or higher. In earlier revisions the network can specify that the RER be included (see 3.7.2.3.2.13 Extended System Parameters Message, "PILOT REPORT" of the 3GP2 C.S0005-0 Upper Layer Signaling Standard for cdma2000 Spread Spectrum Systems standard).

Typically the Radio Environment Report is a report from the communication unit regarding its received pilot energies (Ec/Io) from any base stations in the unit's vicinity. Note that the specific contents of the RER is defined in 2.1.1.4.1.2.1 of Signaling Link Access Control (LAC) Specification for cdma2000 Spread Spectrum Systems which is a standards document used to define Layer 2 operation for CDMA cellular systems. The network uses this information to determine if the mobile station can be connected to more than one base station during the mobile's transition to operation on the Traffic Channel. Assigning a mobile station to more than one base station is referred to as Channel Assignment into Soft Handoff. The RER normally will provide unique information for every communication unit that reports this information, since the pilot strength measurements will vary between physical locations. Because the RER is based upon communication unit or mobile measurements, the cloned unit cannot provide a duplicate to the real or authorized unit's RER. The network can use this content difference to detect that a cloned phone is also trying to answer a network-initiated call.

Thus when the network or base station sends a Page Message or General Page Message to the mobile station, the base station will listen for a Page Response Message on the Access Channel (or Extended Access Channel). When the network receives Page Response Messages from both the clone and the real communication unit or mobile station, the normal or Layer 2 software (basic connection software) will still decide that the messages are duplicates. This is because Layer 2 only looks at identification including sequence number information. A further step of comparing the RER information from both messages can decide or determine that the messages are unique, even though the remaining information is identical. Thus the clone communication presence can be detected by comparing RER information from 2 received Page Response Messages. If normal software or message processing declares the messages to be duplicates, but the RER content is different, one of the Page Response Messages is declared to be from a clone.

One example in a cdma2000 communication system of the properties of the response message being not correlated, more specifically of the time of arrival not being correlated, will be discussed. The call screening unit or processor will need to determine, given the time of arrival (TOA) of the response messages, whether a communication unit operating according to the standard specified terms and conditions could have sent both response messages or in other words how long a mobile would wait before resending the original access probe if it failed to get the BTS Ack Order or acknowledgment from the base station. According to the cdma2000 Standards, once the mobile sends the access probe (i.e. Page Response message), it will start an access timer and wait for the BTS to acknowledge receipt of the access probe. This time period is defined as:

$$TO=(2+ACH\_ACC\_TMO)\times 80\text{ ms}$$

The access timeout value used by the mobile station is driven by the ACH_ACC_TMO variable. This variable is actually set via the ACC_TMO field in the Access Parameters message. The valid range for this field is 0–17; thus, the access timeout used by the mobile can range from 160 ms to 1360 ms. The ACC_TMO field is configurable and changeable via the DB:AccTmo database parameter. Different suppliers of equipment can use different values for this parameter or it can be changed in the field. If the default value is '1', then TO=(3) 80 ms=240 ms. Thus communication units or phones accessing this system should wait at least 240 ms for a BTS Ack Order message after repeating a response message, e.g. before timing out and sending a subsequent access probe. Therefore if a base station or call screening unit observes a relative TOA, difference between response messages of less than 240 ms, this property is not correlated and the base station or call screening unit can decide that a cloned communication unit was the originator of one of the response messages.

The call screening unit or other suitable apparatus can be advantageously used in a base station to detect cloned communication units, e.g. detecting unauthorized communication units, in, for example a communication system that is using a code division multiple access air interface protocol, such as the protocol defined by the cdma2000 standards promulgated by the 3GPP2 task force. As a brief review, the base station in this system comprises a receiver operable to receive, responsive to a page message, a first response message and a second response message and a processor. The processor is operable: to determine whether a first identification field corresponding to the first response message is equivalent to a second identification field corresponding to the second response message; if so to assess whether a first radio environment report corresponding to the first response message is not correlated, respectively, with a second radio environment report corresponding to the second response message; and when this is so, to decide that one of the first response message and the second response message corresponds to a cloned communication unit. The respective identification fields can comprise one or more of an electronic serial number, mobile identification number, and message sequence number and the first environmental report comprises information corresponding to other radio signals that are available to the communication unit. Furthermore in some embodiments the base station specifically the processor, prior to the deciding, is further operable to assess whether a relative arrival time corresponding to the first response message and the second response message satisfies a threshold.

Figure 3:
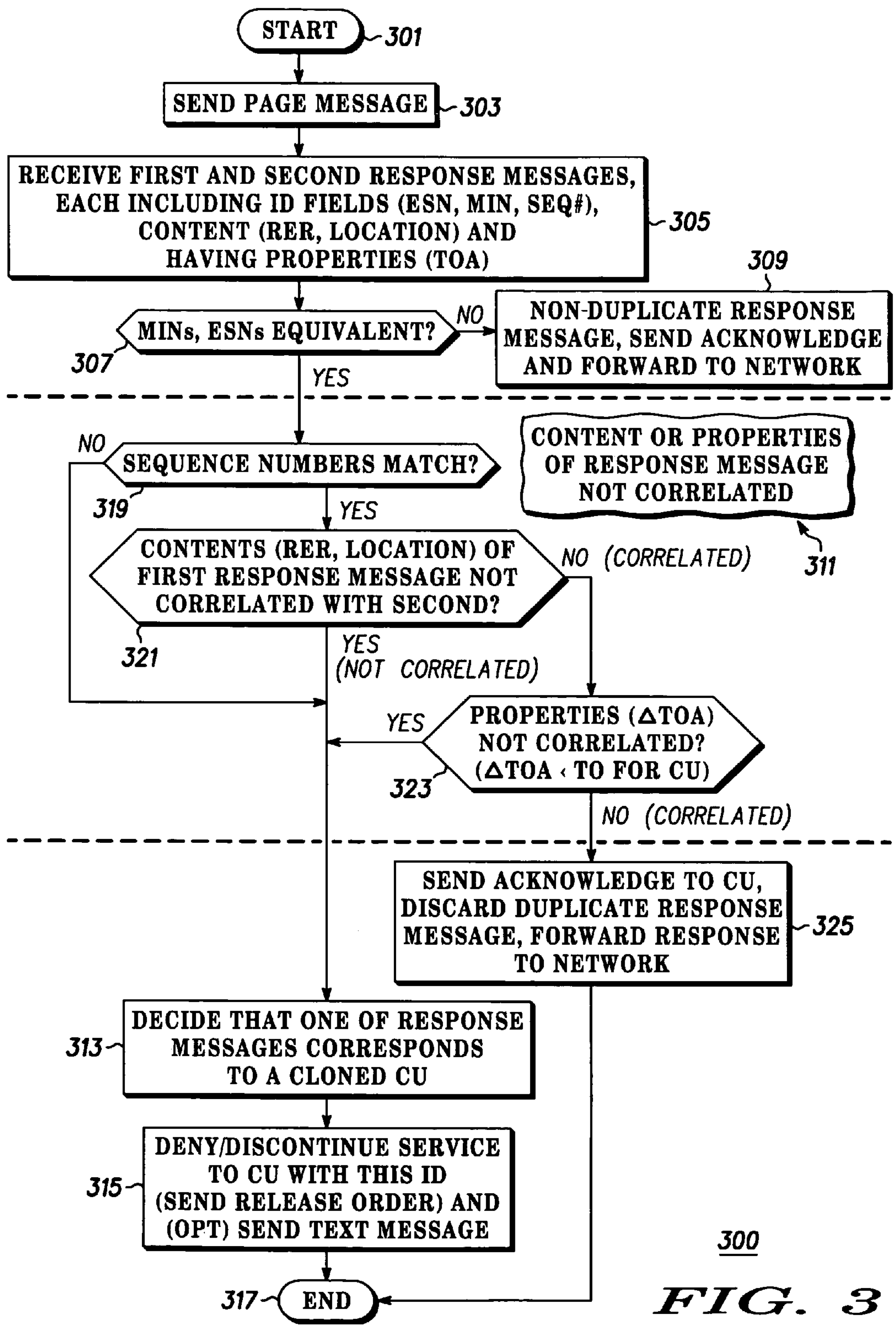
FIG. 3 depicts a flow chart illustrating a method embodiment of detecting cloned communication units.

Referring to FIG. 3, a flow chart illustrating a method embodiment of detecting cloned communication units will be discussed and described. The method of FIG. 3 can be performed or practiced by the apparatus or call screening unit of FIG. 2 or other apparatus with similar functionality or capability. The FIG. 3 flow chart illustrates a method of detecting duplicated or cloned communication units, for example by virtue of signals on an inbound access channel, and begins at 301. At 303 a page message is sent to a communication unit. At 305 a signal, responsive to the page message, is received, where the signal, for example comprises a first response message and a second response message, each response message comprising identification fields, such as MINs, ESNs, and message sequence numbers in a cdma2000 communication system. Furthermore each response message comprises one or both of content, for example a radio environment report (RER) or location indicia, and properties, such as a time of arrival (TOA). At 307 it is determined whether a first identification field corresponding to the first response message is equivalent to a second identification field corresponding to the second response message, or specifically whether the MINs and ESNs are equivalent. If the MINs and ESNs are not identical the response messages are not duplicates and at 309, an acknowledgment is sent to the proper communication unit (unit with MIN, ESN that page message was sent to) and the response message is forwarded to the network (MSC, etc.). Note that this is a "normal" mode of operation for many networks.

Then at 311 when the first identification field is equivalent to the second identification field, the method assesses whether a first message content or a first message property corresponding to the first response message is not correlated, respectively, with a second message content or a second message property corresponding to the second response message. If the content or property of the respective response messages is not correlated, at 313 it is determined or decided that one of the first response message and the second response message corresponds to a cloned communication unit. At 315 service is denied or discontinued for the communication unit corresponding to the identification field, ESN and MIN, and optionally a text message is sent to this (these) communication units, indicating for example that service is required or the like and the method ends at 317.

More detailed embodiments of the process at 311 will now be explained with reference to 319–325. At 311, sequence numbers for the response messages are checked for a match. If they do not match a cloned communication unit has been detected and 313 followed by 315 are performed. If the sequence numbers match, 321 and 323 further assess whether first environmental information is not correlated with second environmental information, where the first and second environmental information corresponds to an environment of a first and second communication unit that is, respectively the source of the first and the second response message. More specifically 321 determines whether the contents of the response messages are not correlated, where the contents correspond, for example, to a radio environment, such as one or both of signals available and strength of available signals (for example a radio environment report (RER) for a CDMA system), or a location, such as known GPS coordinates for, respectively, the first and the second communication unit. Note that in some systems the page message will request that contents be provided in the response message, for example in some versions of cdma2000 systems the page message that is sent will indicate that an RER is to be provided by the communication unit with the response message. If the contents are not correlated, indicating the response messages are from different communication units, a cloned communication unit has likely been detected and 313 followed by 315 are performed.

If the contents are correlated at 321, then 323 in assessing whether the first message property is not correlated with the second message property further assesses whether a first arrival time (time of arrival—TOA) of the first response message is not correlated with a second arrival time of the second response message. More specifically in some embodiments the first and the second arrival time are compared to provide a relative arrival time (delta TOA) and when the relative arrival time satisfies a threshold determining that the first message property is not correlated with the second message property. The threshold is a time out (TO) value for the communication unit and this value is often a system configurable value designating the minimum amount of time a given communication unit must wait before sending a repeated response message as discussed above. Thus if the relative arrival time is less than the time out value (delta TOA<TO) it is likely that a cloned communication unit has been detected and hence 313 followed by 315 are performed. If the relative time of arrival of the response messages are correlated at 323 then 325 sends an acknowledge message to the communication unit, discards the duplicate response message and forwards the remaining response message to the network.

While the method of FIG. 3 may be advantageously practiced in a base station other entities within the network may be utilized to practice the method in total or in part. Also note that any access technology (time division multiple access or frequency division multiple access or combinations for example) that can force or specify message characteristics such as content or properties such that authorized and cloned communication units can be distinguished based on differences in data transmission characteristics is a candidate for using the principles and concepts disclosed herein.

Thus an apparatus and methodology has been disclosed and described that provides a low latency, low cost technique for detecting cloned communication units on an inbound channel, for example an access channel. Various embodiments of methods, systems, and apparatus for detecting cloned or duplicated communication units so as to facilitate and provide for identification and service denial for such units in an efficient and timely manner have been discussed and described. It is expected that these embodiments or others in accordance with the present invention will have application to many wide area networks as well as wireless local area networks. The disclosure extends to the constituent elements or equipment comprising such systems and specifically the methods employed thereby and therein. Using the inventive principles and concepts disclosed herein advantageously allows or provides for low latency and low network overhead detection of cloned communications units or devices, which can be beneficial to users and service providers a like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a base station of detecting cloned communication units, the method comprising:

receiving, responsive to a page message, a first response message and a second response message;

determining whether a first identification filed corresponding to the first response message is equivalent to a second identification field corresponding to the second response message;

when the first identification filed is equivalent to the second identification field, assessing whether one of a first message content and a first message property corresponding to the first response message is not correlated, respectively, with one of a second message content and a second message property corresponding to the second response message; and when the one of the first message content and the first message proverty is not correlated, respectively, with the one of the second message content and the second message property, deciding that one of the first response message and the second response message corresponds to a cloned communication unit, wherein the assessing whether the first message property is not correlated with the second message property further comprising assessing whether a first arrival time of the first response message is not correlated with a second arrival time of the second response message, and wherein the first and the second arrival time are compared to provide a relative arrival time and when the relative arrival time satisfies a threshold determining that the first message property is not correlated with the second message property.

2. A call screening unit in a communication system, the call screening unit operable to detect cloned communication units operating in the communication system and comprising;

an input for receiving a first response message and a second response message; and a processor operable;

to determine whether a first identification field corresponding to the first response message is equivalent to a second identification field corresponding to the second response message;

when the first identification field is equivalent to the second identification field, to assess whether one of a first message content and a first message property corresponding to the first response message is not correlated, respectively, with one of a second message content a second message property corresponding to the second response message;

when the one of the first message content and the first message property is not correlated, respectively, with the one of the second message content and the second message property, to decide that one of the first response message and the second response message corresponds to a cloned communication unit;

to assess wither a first arrival time of the first response message is not correlated with a second arrival time of the second response message; and to compare the first and the second arrival time to provide a relative arrival time and when the relative arrival time satisfies a threshold determined that the first message property is not correlated with the second message property.

3. A base station operable to detect cloned communication units, the base station comprising:

a receiver operable to receive, responsive to a page message, a first response message and a second response message; and a processor operable;

to determine whether a first identification field corresponding to the first response message is equivalent to a second identification field corresponding to the second response message;

when the first identification field is equivalent to the second identification field, to assess whether a first radio environment report corresponding to the first response message is not correlated, respectively, with a second radio environment report corresponding to the second response message;

when the first radio environment report is not correlated with the second radio environment report, to decide that one of the first response message and the second response message corresponds to a cloned communication unit; and wherein the processor, prior to the deciding, is further operable to assess whether a relative arrival time corresponding to the first response message and the second response message satisfies a threshold.

* * * * *